United States Patent
Ray et al.

(10) Patent No.: US 9,283,923 B2
(45) Date of Patent: Mar. 15, 2016

(54) LADDER HONEYCOMB HOOD STRUCTURE FOR A MOTOR VEHICLE FOR PEDESTRIAN PROTECTION

(75) Inventors: Alok Kumar Ray, Maharashtra (IN); Santosh Gurukumar Hiremath, Maharashtra (IN); Siddalingappa Jirli, Maharashtra (IN); Sasidar Kanigelpual, Maharashtra (IN)

(73) Assignee: Mahindra and Mahindra Limited, Maharashtra (IN)

( * ) Notice: Subject to any disclaimer, the term of this patent is extended or adjusted under 35 U.S.C. 154(b) by 0 days.

(21) Appl. No.: 14/113,795

(22) PCT Filed: Apr. 26, 2012

(86) PCT No.: PCT/IN2012/000306
§ 371 (c)(1),
(2), (4) Date: Jan. 9, 2014

(87) PCT Pub. No.: WO2012/153344
PCT Pub. Date: Nov. 15, 2012

(65) Prior Publication Data
US 2014/0110971 A1    Apr. 24, 2014

(30) Foreign Application Priority Data

Apr. 26, 2011   (IN) .......................... 1315/MUM/2011

(51) Int. Cl.
*B62D 25/12*     (2006.01)
*B60R 21/34*     (2011.01)
*B62D 25/10*     (2006.01)

(52) U.S. Cl.
CPC .............. *B60R 21/34* (2013.01); *B62D 25/105* (2013.01); *B60R 2021/343* (2013.01)

(58) Field of Classification Search
CPC ...... B62D 25/10; B62D 25/105; B62D 25/12; B62D 21/15; B60R 2021/343
USPC ............... 180/69.2, 69.21, 69.22, 69.23, 274; 296/193.11, 187.04, 187.09; 280/784
See application file for complete search history.

(56) References Cited

U.S. PATENT DOCUMENTS 5,124,191 A * 6/1992 Seksaria ........................ 428/178
6,179,364 B1 * 1/2001 Takahashi ........................ 296/76

(Continued)

FOREIGN PATENT DOCUMENTS

EP    1228947    * 8/2002
FR    2621677    * 4/1989

(Continued)

*Primary Examiner* — Katy M Ebner
*Assistant Examiner* — Emma K Frick
(74) *Attorney, Agent, or Firm* — Cozen O'Connor

(57) ABSTRACT

A ladder honeycomb hood structure for a motor vehicle for pedestrian protection. The ladder has an inner panel having ten numbers of complete equally sized hexagonal of equal diameter cutout with on side making 10° to the horizontal. A first central ladder cutout formed with a horizontal rib. A second central ladder cutout formed with smaller length of horizontal rib than that of the first ladder above the first central ladder. A third central ladder cutout 4 formed below the first central ladder with horizontal rib, merged with a rear channel, having a bigger length than that of the first central ladder. The hood structure arrangement made in such a way that the hexagonal cutouts equally formed on both sides of the central ladders. A number of unequal size hexagonal cutouts formed in the space between equal size hexagons the and hood side section.

16 Claims, 3 Drawing Sheets

(56) References Cited

U.S. PATENT DOCUMENTS

| | | | |
|---|---|---|---|
| 6,883,627 B1 * | 4/2005 | Staines et al. | 180/69.2 |
| 7,090,289 B2 * | 8/2006 | Koura | 296/193.11 |
| 7,293,624 B2 * | 11/2007 | Adachi | 180/274 |
| 7,467,680 B2 * | 12/2008 | Mason | 180/69.2 |
| 7,578,548 B2 * | 8/2009 | Behr et al. | 296/193.11 |
| 7,582,349 B1 * | 9/2009 | Herrera et al. | 428/116 |
| 7,690,720 B2 * | 4/2010 | Wang et al. | 296/193.11 |
| 7,810,877 B2 * | 10/2010 | Ishitobi | 296/193.11 |
| 8,052,198 B2 * | 11/2011 | Seksaria et al. | 296/187.04 |
| 8,075,048 B2 * | 12/2011 | Kimoto et al. | 296/193.11 |
| 8,276,975 B2 * | 10/2012 | Kimoto et al. | 296/187.04 |
| 8,356,857 B2 * | 1/2013 | Ralston et al. | 296/187.04 |
| 8,662,571 B2 * | 3/2014 | Grattan | 296/193.11 |
| 8,845,012 B2 * | 9/2014 | Sekikawa et al. | 296/193.11 |
| 2004/0021342 A1 * | 2/2004 | Fujimoto | 296/193.11 |
| 2012/0298436 A1 * | 11/2012 | Ho | 180/69.2 |

FOREIGN PATENT DOCUMENTS

| | | |
|---|---|---|
| JP | 2005193863 | 7/2005 |
| JP | 2007176328 | 7/2007 |
| JP | 2007210495 | 8/2007 |
| JP | 2011156885 | 8/2011 |

* cited by examiner

LADDER HONEYCOMB HOOD STRUCTURE FOR A MOTOR VEHICLE FOR PEDESTRIAN PROTECTION

CROSS REFERENCE TO RELATED APPLICATIONS

This is a U.S. national stage of application No. PCT/IN2012/000306, filed on Apr. 26, 2012. Priority is claimed on Indian Application No. 1315/MUM/2011, filed Apr. 26, 2011, the content of which is incorporated herein by reference.

FIELD OF INVENTION

The present invention is related to vehicle hood structure. More particularly the present invention is related to hood inner structure having deformable head impact zone and used in automobile vehicle and like other vehicles that protects the pedestrian at the time of impact.

BACKGROUND OF THE PRESENT INVENTION

Accident investigations revealed that almost two thirds of the 1.2 million people killed in road traffic crashes worldwide are pedestrians. Pedestrian safety is now a high profile issue within the automotive industry to compliance the safety stringent legislations (Regulation 78/2009 and Euro NCAP). The motive of our work is to design the bonnet which meets EORO NCAP pedestrian legislation requirements.

OEMs throughout the world use expensive materials like Aluminum and expensive techniques like Pop up Hood and air bags to bring down HPC value and offer pedestrian safety. Most of the Vehicles rated above 3 stars use Aluminum or Pop up kind of technology to bring down the HPC Value. However, the present invention uses conventional steel panel with a Ladder honeycomb structure concept to meet pedestrian safety related regulations. Few OEMs are using honeycomb structure but are not using ladder structure which helps in energy absorption and controlled deformation at the center.

Most of the vehicle bonnets include a generally planar or curvilinear outer skin which is joined to a series of reinforcing ribs provided by a stamped metallic sheet of material. During vehicle and pedestrian collision, it is observed that the pedestrian is seriously injured due to the pedestrian's head striking the bonnet of the vehicle. To keep the risk of injury as low as possible, controlled resilience in the head impact region of the bonnet is required. The present invention addresses this problem and provides the novel inner hood structure that will protect the pedestrian in case of pedestrian impact by absorbing the impact energy.

OBJECTIVES OF THE PRESENT INVENTION

The main objective of the present invention is to provide vehicle hood inner structure for pedestrian protection.

Another objective of the present invention is to provide vehicle hood inner structure with honeycomb ladder having a definite cut outs for pedestrian protection.

Another objective of the present invention is to provide vehicle hood inner structure for pedestrian protection wherein head impact energy is absorbed by the honeycomb ladder structure by undergoing, deformation.

SUMMARY OF THE INVENTION

Accordingly the invention provides the ladder honeycomb hood structure for a motor vehicle for pedestrian protection comprising an inner panel having ten numbers of complete equally sized Hexagonal of equal diameter cut out with on side making 10° to the horizontal; a first Central ladder cutout formed with horizontal rib; a second Central ladder cutout formed with smaller length of horizontal rib than that of first ladder above the said first central ladder; a third Central ladder cutout formed below the said first central ladder with horizontal rib, merged with rear channel, having bigger length than that of the said first central ladder; the said hood structure an arrangement made in such a way that the said hexagonal cut outs equally formed on both side of said central ladder; and a number of unequal size hexagonal cut out formed in the space between said equal size hexagons and hood side section.

BRIEF DESCRIPTION OF THE FIGURES

The invention will become more fully understood from the following detailed description, taken in conjunction with the accompanying drawings, wherein.

DETAILED DESCRIPTION OF THE PRESENTLY PREFERRED EMBODIMENTS

Figure 1:
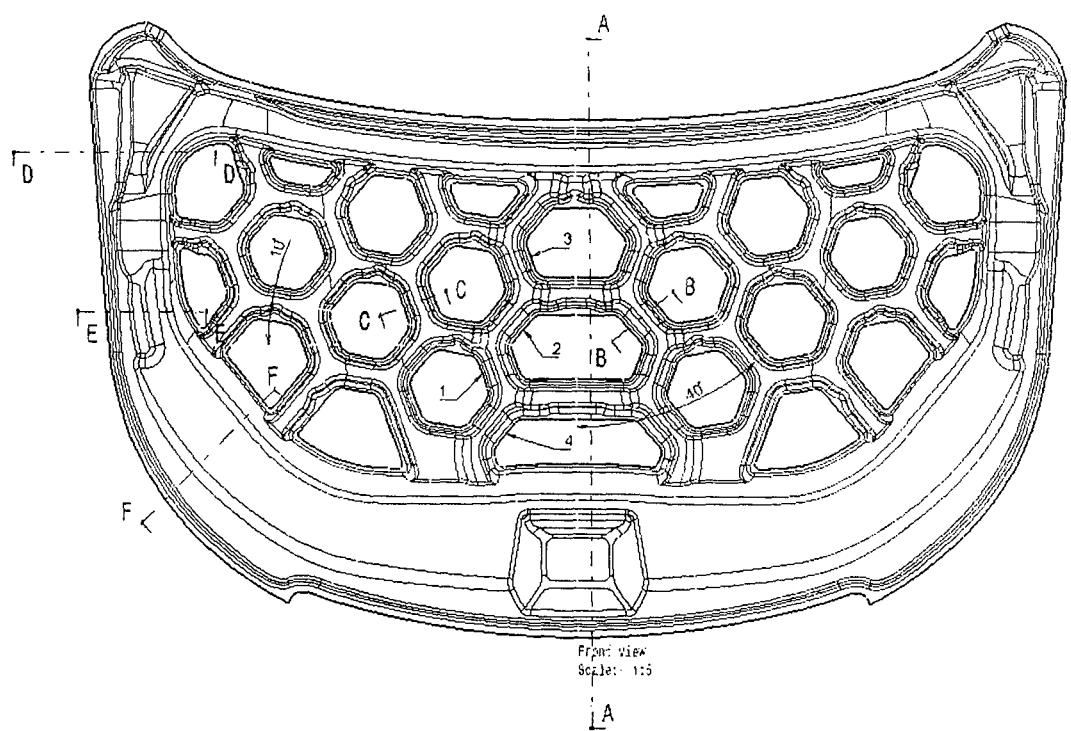
FIG. 1 shows the top view of the honeycomb structure for hood inner panel of a motor vehicle for pedestrian protection in accordance with the present invention.
Figure 2:
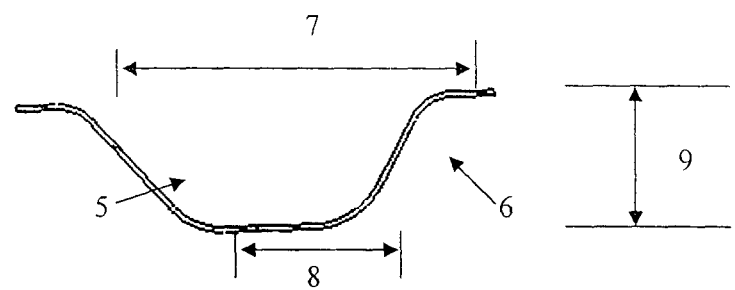
FIG. 2 shows the cross sectional views of honeycomb structure of the hood inner panel.
Figure 2:
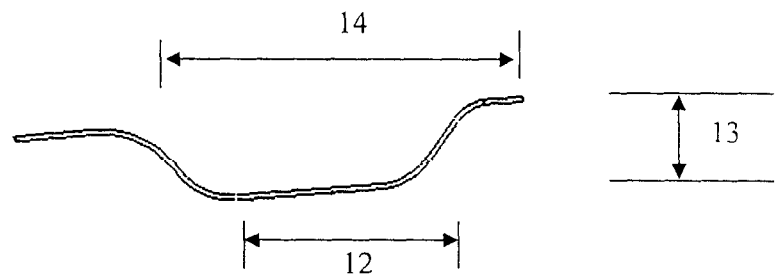

Pedestrian protection basically requires the following principals:
 sufficient deformation space to absorb the kinetic energy of the pedestrian head
 construction of Vehicle structure softer at deformation zones necessary deformation can occur to dissipate impact energy.

Hexagonal cut out 1 has a diameter of approximately 120 mm, there are totally 10 complete equally sized hexagonal cut outs in the panel
 Central ladder cutout 2 has dimension of 215×107 mm
 Central ladder cutout 3 has dimension of 160×115 mm
 Central ladder cutout 4 has dimension of 272×73 mm
 Central ladder structure has 3 horizontal ribs in the center. Of those, 1 rib is merged with a rear channel and these ribs make an angle of 10 degrees with one of the sides of hexagonal cutouts. The depth 13 in Fig A is 10 mm. The cut outs are stretched hexagonal bigger than hexagonal cutouts, purposefully given to reduce weight at the center and at the same time the depth of both the sides of ladder channels (Fig B) is increased to 16 mm. This concept helps in achieving uniform stiffness in the panel.

The channels of the center ladder section shown in Fig B and Fig A, have a total depth 9 of 16 mm, the wall 5 has a 60 degree angle, the wall 6 has a 50 degree angle with the skin panel, the width at the root 8 without radius is approximately 21 mm and the width at the open end of the channel 14 is approximately 43 mm. The width at the root 12 without radius is approximately 22 mm and the width at the open end of the channel 7 is approximately 34 mm. (The wall angle of channels in the panel may vary from 65-50 degrees, it can be 75-40 also)

The Honeycomb geometry at these area looks incomplete which is purposefully done all over the profile to merge the honeycomb C-section to side section of the Hood. This kind of arrangement creates a predefined path for energy distribution. When head impact comes at any point of the hood the impact energy transmits uniformly in all the directions through honeycomb C Section and finally distributes equally to Hood side sections in the pattern as shown in the image, which helps in absorbing the head impact force during pedestrian collision by reducing the peak.

The Honeycomb geometry at D, E, and F area looks incomplete which is purposefully done all over the profile to merge the honeycomb C-section to side section of the Hood. This kind of arrangement creates an predefined path for energy distribution. When head impact comes at any point of the hood, the impact energy transmits uniformly in all the directions through honeycomb C Section and finally distributes equally to Hood side sections in the pattern as shown in the image, which helps in absorbing the head impact force during pedestrian collision by reducing the peak.

Figure 3:
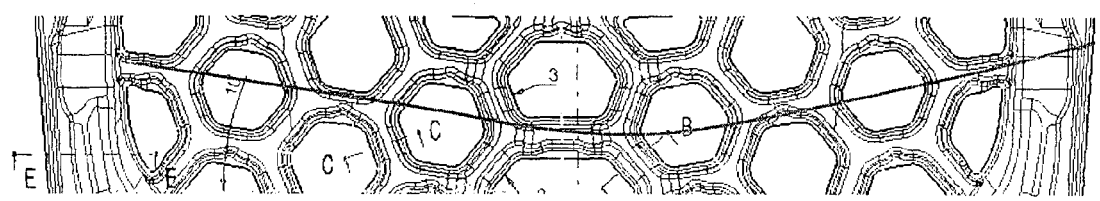
FIG. 3 shows an arc made by the horizontal sides of Central ladder channels and one side of honeycombs as per the present invention.

Hexagonal cut out 1 whose one side is 10 degrees from the horizontal line is so-positioned to meet torsional stiffness of hood. The horizontal sides of Central ladder channels and one side of honeycombs together make an arc as shown in the FIG. 3. There is the possibility of crumple if channels are in the horizontal axis, and this structure helps in meeting durability as well as pedestrian safety.

Initially, ladder structure was designed to minimize the weight at the center. But CAE iterations revealed that because of weight reduction the stiffness failed at the center, then to maintain the same stiffness all over the panel, the present invention addresses the solution. The depth locally increased at ziz zag rib at the center ladder structure to gain the stiffness.

The main hurdle was Optimization between Durability and pedestrian safety. The hood inner panel should be stiff enough to pass durability and flexible enough to absorb head impact energy. This is totally a balanced process in which one cannot over design the hood for durability or pedestrian safety. If the design is too flimsy this will lead to failure in durability and if the design is too stiff this will lead to failure in pedestrian test. According to the latest iterations done on CAE—both durability and pedestrian tests we have achieved the target of passing all the DVP criterions and also Rated 5 STAR for EURO NCAP pedestrian safety legislation.

Maintaining clearance 75 mm between hood and engine compartment parts was a big challenge. The section modulus was too tight, and there was a restriction of less space below the hood and the section modulus had to be designed with this constraint to get a minimum space of 75 mm. The present invention worked out this limit and the purpose of pedestrian safety requirements and durability was solved.

The present invention provides following technical advantages
1. Uniform hood stiffness
2. Optimized draft angles to meet the safety, durability, NVH, customer sensitive (feel good) requirements.
3. Refined sections in order to reduce head deceleration and risk to death.

We claim:

1. A ladder honeycomb hood structure for a motor vehicle for pedestrian protection comprising:
    an inner panel having ten complete equally sized first hexagon cut-out portions of equal diameter, each of said first hexagon cut-out portions comprises one side disposed at ten degrees to a horizontal direction;
    a first central ladder cut-out formed with a first rib, said first rib extending in the horizontal direction and having a first length;
    a second central ladder cut-out located above the first central ladder cut-out, said second central ladder cut-out formed with a second rib, said second rib having a second length shorter than the first length of the first rib, said second rib extending in the horizontal direction;
    a third central ladder cut-out located below the first central ladder cut-out, said third central ladder cut-out formed with a third rib, said third rib having a third length longer than the first length of the first rib, said third rib extending in the horizontal direction;
    wherein the first, second, and third ribs of the central ladder cut-outs are disposed to resemble a ladder shape, defining a central ladder;
    said hood structure is arranged such that said first hexagon cut-out portions are symmetrically formed on both sides of said central ladder; and
    a plurality of unequally sized second hexagon cut-out portions are formed in a space between the first hexagons and a hood side section.

2. The ladder honeycomb hood structure as claimed in claim 1, wherein a diameter of said equally sized first hexagon cut-out portions are 120 mm.

3. The ladder honeycomb hood structure as claimed in claim 2, wherein said first central ladder cut-out has a dimension of 215×107 mm, said second central ladder cut-out has a dimension of 160×115 mm, and said third central ladder cut-out has a dimension of 272×73 mm.

4. The ladder honeycomb hood structure as claimed in claim 2, wherein the center ladder has channels having a root, an open end, walls, and a depth, with the depth being 16 mm, the walls having a 40 to 75 degree angle with respect to a skin panel, a width at the root being approximately 21 mm, the width at the open end of the channel being approximately 43 mm, and the width at the root being approximately 22 mm and the width at the open end being approximately 34 mm.

5. The ladder honeycomb hood structure as claimed in claim 2, wherein said unequally sized second hexagon cut-out portions are formed symmetrically at both sides of the central ladder.

6. The ladder honeycomb hood structure as claimed in claim 2, wherein said central ladder has a depth, and wherein the depth is locally increased at a zig zag rib at the center ladder structure to increase stiffness of the structure.

7. The ladder honeycomb hood structure as claimed in claim 1, wherein said first central ladder cut-out has a dimension of 215×107 mm, said second central ladder cut-out has a dimension of 160×115 mm, and said third central ladder cut-out has a dimension of 272×73 mm.

8. The ladder honey comb honeycomb hood structure as claimed in claim 7, wherein the center ladder has channels having a root, an open end, walls, and a depth, with the depth being 16 mm, the walls having a 40 to 75 degree angle with respect to a skin panel, a width at the root being approximately 21 mm, the width at open end of the channel being approximately 43 mm, and the width at the root being approximately 22 mm and the width at the open end being approximately 34 mm.

9. The ladder honeycomb hood structure as claimed in claim 7, wherein said central ladder has a depth, and wherein the depth is locally increased at a zig zag rib at the center ladder structure to increase stiffness of the structure.

10. The ladder honeycomb hood structure as claimed in claim 1, wherein the central ladder section has channels having a root, an open end, walls, and a depth, with the depth being 16 mm, the walls having a 40 to 75 degree angle with respect to a skin panel, a width at the root being approximately 21 mm, the width at the open end of the channel being approximately 43 mm, the width at the root being approximately 22 mm and the width at the open end being approximately 34 mm.

11. The ladder honeycomb hood structure as claimed in claim 10, wherein said channel walls have an angle in the range of 50 to 65 degrees.

12. The ladder honeycomb hood structure as claimed in claim 11, wherein said unequally sized second hexagon cut-out portions are formed symmetrically at both sides of the central ladder.

13. The ladder honeycomb hood structure as claimed in claim 10, wherein the depth is locally increased at a zig zag rib located at the center ladder to increase stiffness of the honeycomb hood structure.

14. The ladder honeycomb hood structure as claimed in claim 1, wherein said unequally sized second hexagon cut-out portions are formed symmetrically at both sides of the central ladder.

15. The ladder honeycomb hood structure as claimed in claim 14, wherein said central ladder has a depth, and wherein the depth is locally increased at a zig zag rib at the center ladder to increase stiffness of the honeycomb hood structure.

16. The ladder honeycomb hood structure as claimed in claim 1, wherein said central ladder has a depth, and wherein the depth is locally increased at a zig zag rib at the central ladder to increase stiffness of the structure.

* * * * *